Figure 1:
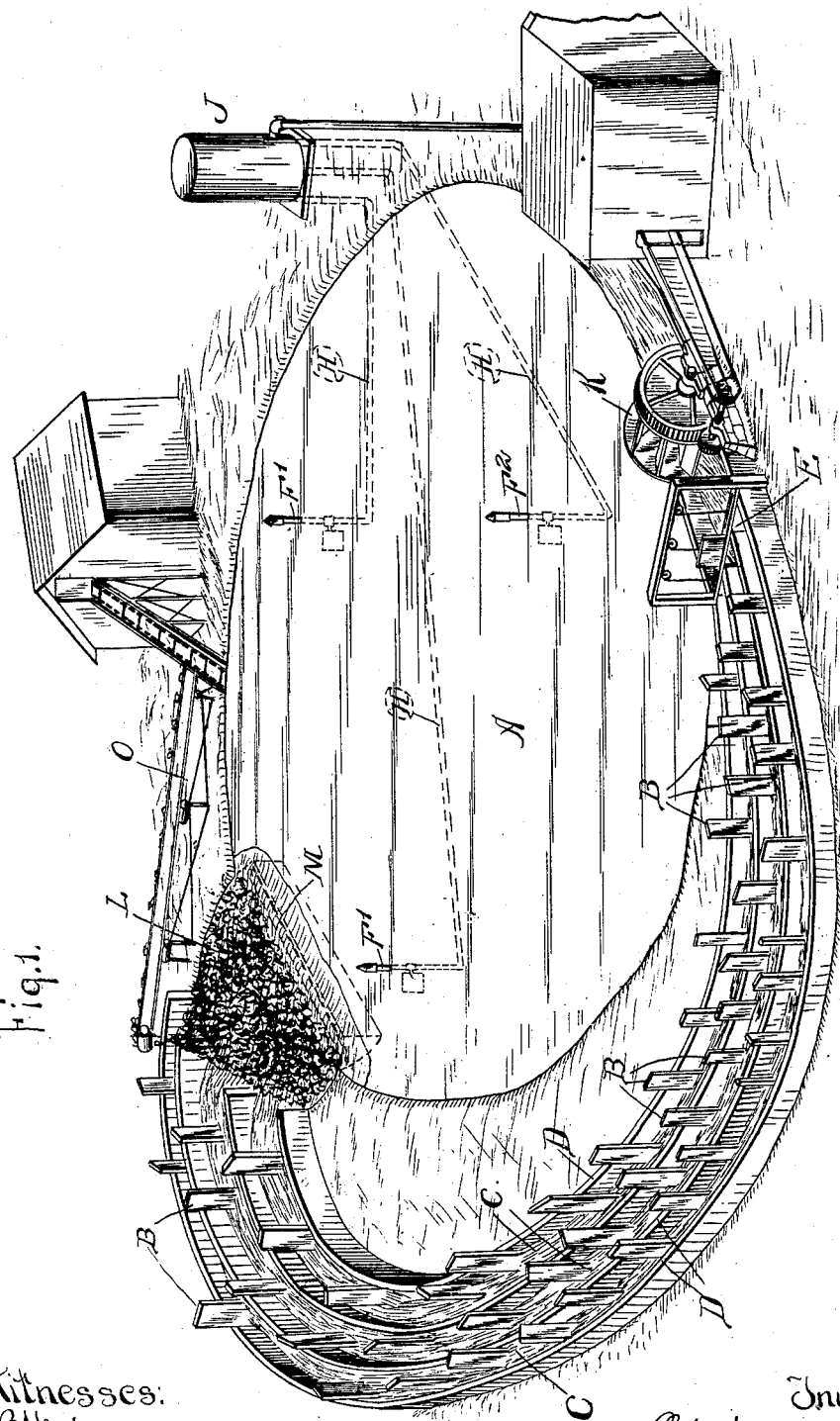

No. 660,772. Patented Oct. 30, 1900.
O. GUTHRIE.
FACILITATING CONGELATION OF WATER.
(Application filed June 5, 1899.)
(No Model.) 2 Sheets—Sheet 1.

Witnesses:
J B Weir
E. C. Semple.

Inventor
Ossian Guthrie
By Mown & Darby
Attys

No. 660,772. Patented Oct. 30, 1900.
O. GUTHRIE.
FACILITATING CONGELATION OF WATER.
(Application filed June 5, 1899.)
(No Model.) 2 Sheets—Sheet 2.
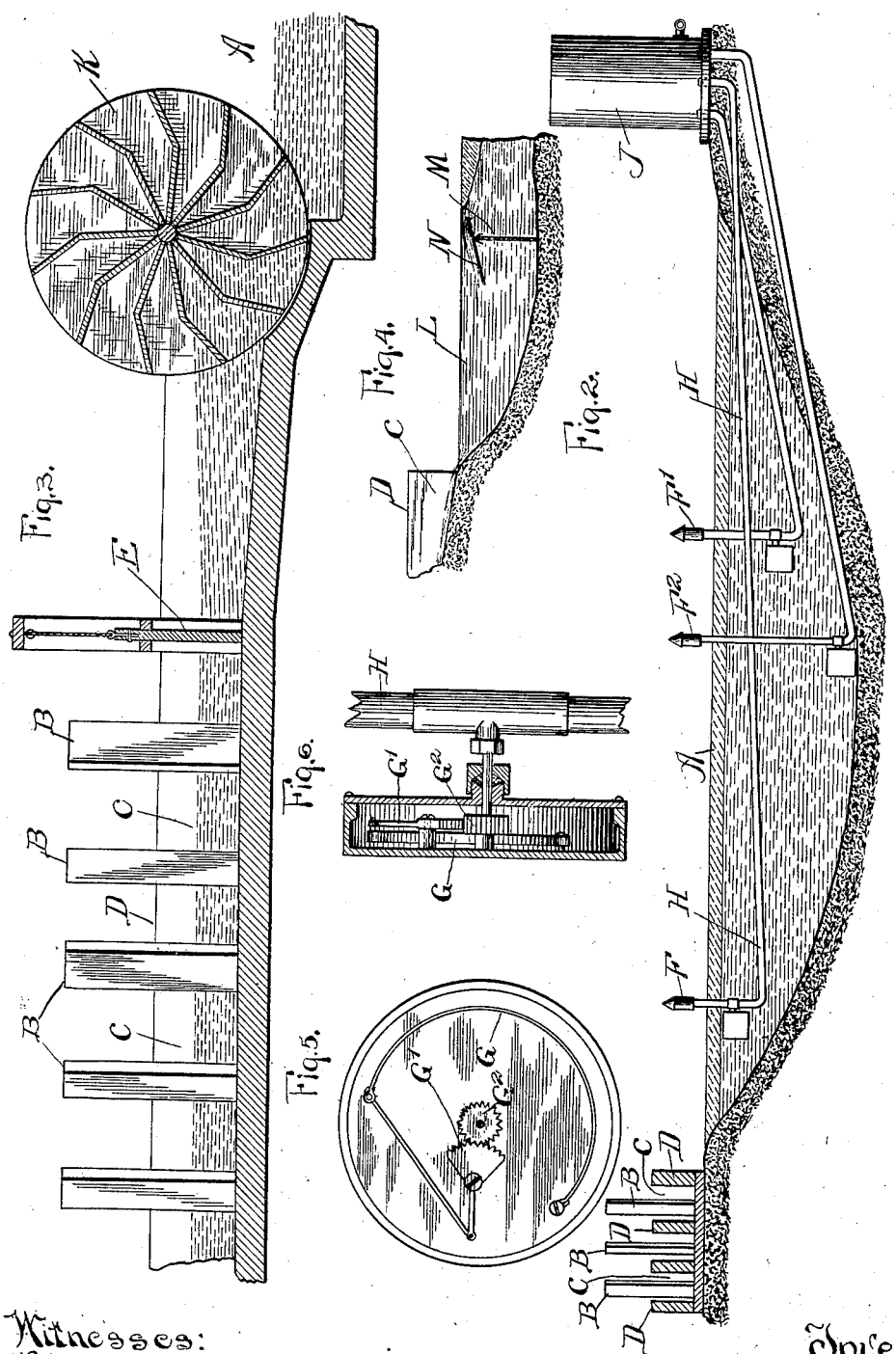
Witnesses:
J B Weir
E. C. Semple.
Inventor
Ossian Guthrie
By Brown & Darby
Attys

UNITED STATES PATENT OFFICE.

OSSIAN GUTHRIE, OF CHICAGO, ILLINOIS.

FACILITATING CONGELATION OF WATER.

SPECIFICATION forming part of Letters Patent No. 660,772, dated October 30, 1900.

Application filed June 5, 1899. Serial No. 719,409. (No model.)

*To all whom it may concern:*

Be it known that I, OSSIAN GUTHRIE, a citizen of the United States, residing at Chicago, in the county of Cook and State of Illinois, have invented a new and useful Improvement in Facilitating the Congelation of Water, of which the following is a specification.

This invention relates to improvements for facilitating the congelation of water.

The object of the invention is to provide means whereby the formation of ice in natural bodies of water, artificial lakes or ponds, or the like is facilitated and increased.

The invention consists, substantially, in the construction, arrangement, combination, and mode of procedure, all as will be more fully hereinafter set forth, as shown in the accompanying drawings, and finally particularly pointed out in the appended claims.

Referring to the accompanying drawings, and to the various views and reference-signs appearing thereon, Figure 1 is a view illustrating a lake, pond, or other body of water and showing the application of the invention in facilitating and accelerating ice formation. Fig. 2 is a transverse section through the lake and showing the signals employed in connection with the invention. Fig. 3 is a broken detail view in section, illustrating a form of means for delivering the water from the lake, pond, or the like and into the race or sluice ways or plateau. Fig. 4 is a broken detail view of the cooling pool or basin at the point where the plateau, raceways, or sluices deliver back into the lake. Figs. 5 and 6 are details of the thermostat for operating the signals.

The same part is designated by the same reference-sign wherever it occurs.

In my prior patent, No. 250,235, dated November 29, 1881, I have shown, described, and claimed an apparatus whereby the formation of ice in natural bodies of water or artificial lakes, ponds, or the like is facilitated by causing the water to move or circulate, thus not only facilitating the formation of the ice, but also preventing the formation of small bubbles of air on the surface of the forming ice, which become frozen into the body of the ice, and in my prior patent, No. 277,024, dated May 8, 1883, I have described and claimed an arrangement and mode of procedure for facilitating the congelation of water in ponds, lakes, and the like wherein the water-supply which is delivered into the lake, pond, or the like is cooled or the temperature thereof is reduced before it is delivered. It is the purpose of the present invention to improve the method and operation outlined in said patents and to provide an arrangement wherein the congelation of the water is greatly facilitated and accelerated, thus increasing the harvest of ice.

It is an established fact that in passing from water to ice the water must yield up its latent heat, amounting to about one hundred and forty-two British heat units. This liberated heat remaining in the body of the water very greatly retards the formation of ice by elevating the temperature of the body of water.

The first feature of my invention to which attention will be directed is the provision of means whereby the water the temperature of which has been raised by the liberated latent heat of congelation is withdrawn from the pond, lake, or the like, the temperature thereof reduced, and then returned to the lake or pond at a temperature below that of the body of water in the lake or pond. In this manner the congelation of the water in the lake or pond is facilitated and accelerated and the quantity of ice formed therein greatly increased. In carrying this feature of the invention into practical operation various arrangements and expedients may be resorted to. While, therefore, I have shown and will now describe an apparatus and arrangement embodying the principles of the invention, I desire it to be understood that the particular form shown is merely illustrative, and the invention is not to be limited or restricted thereto.

In carrying out the invention a portion of the water from the lake, pond, or the like (indicated at A) is withdrawn therefrom and delivered onto a suitably-arranged platform formed adjacent to the lake or pond, where it may spread out into a thin sheet and from which it may be returned to the lake or pond at a lower temperature from that at which it was withdrawn. In order to accelerate the absorption of the heat and quickly reduce the temperature of the thin sheet of water passing over the plateau or platform, I may during the initial stages of ice formation on the pond or lake withdraw a suitable amount of the water from the lake or pond and deliver the same upon the plateau, (which latter is entirely separated from the lake,) where such withdrawn water will spread out in a thin sheet. By letting this water stand it will freeze solid, thus providing a frozen surface upon the plateau over which the water subsequently withdrawn from the lake or pond is caused to flow. I may also arrange a series of upright slabs or posts B in the plateau at various points and preferably arranged in irregular order, said slabs or posts being of marble, stone, or other suitable material. These slabs or posts are arranged to extend above the surface of the water and being cooled by the atmospheric temperature serve to extract the heat of the water, thus reducing the temperature thereof. By arranging the posts in irregular order the water is more or less stirred by passing by, and hence every particle of the water is subjected to the cooling effect of the slabs or posts. In addition to the cooling effect of the posts it is obvious that the effect of the temperature of the air exerted upon the surface of the water thus delivered to the plateau serves also to extract or dissipate, to some extent at least, the heat of the water, and if the surface of the plateau is previously frozen, as in the case of extremely low atmospheric temperatures and in the initial stages of ice formation, as above set forth, and when no water is being passed over the plateau, the water is also cooled from below, and in some cases it may be found that the water may be sufficiently cooled in this manner—that is, from the bottom—through contact with the frozen surface of the plateau and from the surface through the contact of the air, and hence the cooling slabs or posts may be omitted, if desired.

I have shown a convenient arrangement for delivering the water to the plateau wherein one or more sluice or raceways C are formed through which the water is passed. These raceways or sluices may be conveniently formed by arranging partition-walls D, placed on edge in parallel relation. These raceways or sluices may be arranged to deliver onto the plateau and from the plateau back into the lake or pond or, if desired, may be made continuous from end to end, receiving the water as withdrawn from the lake or pond at one end and returning it to the lake or pond at the other end. This arrangement is advantageous in the case where the topography of the ground in the vicinity of the lake or pond will not conveniently admit of the formation of a wide plateau, and in any case the raceways or sluices may be arranged near to or far from the edge of the lake or pond to suit the convenience of conditions encountered. The posts or slabs B are shown as arranged in the raceways or sluices.

I have shown a plurality of the raceways or sluices, each controlled at its receiving end by a suitable gate, (indicated at E.) By suitably manipulating the gates any one or more of the sluices or raceways may be closed. The advantage of this is that the amount or quantity of water withdrawn from the lake or pond may be thus varied and regulated according to the rapidity of ice formation in the lake or pond. If the ice forms rapidly, it will be necessary to withdraw a greater amount of water than if the ice forms slowly, for the reason that there will be a greater amount of latent heat liberated. In order that it may be known from the condition of the temperature of the water in the lake or pond just how rapidly the ice is forming, I may arrange suitable signals (indicated at F F' F$^2$) at suitable points in the lake or pond and adapted to operate according to the temperature of the water. For instance, the signal F may be arranged to operate when the temperature of the water falls to a certain degree at a depth of, say, a foot from the surface, and the signal F' may be arranged to give notice of the fall of the temperature of the water to the desired point at, say, halfway to the bottom of the lake, and the signal F$^2$ may similarly indicate the temperature of the water at the bottom of the lake. Of course any number of signals may be employed and any other depths may be taken, those given being merely illustrative of the principles involved. The signals may be of any suitable construction for the purposes desired and may be operated in any desired manner. As illustrative of an operative embodiment I have shown a thermostat comprising a metallic coil or flat ribbon G, composed of two or more different metals possessing different coefficients of expansion and connected at the free end thereof to a segment-rack G', arranged to engage a pinion G$^2$, the shaft of which is suitably connected to a valve in a pipe H, through which compressed air or other suitable medium is delivered to a signal-whistle—for instance, as from a storage-tank J. By this arrangement it will be seen that when the temperature of the lake at different depths falls to the required point suitable for the formation of ice the corresponding signal will be given, and hence the amount of water to be withdrawn to be cooled can be correspondingly regulated, it being understood that the greater the rapidity of ice formation the more latent heat will be liberated, and hence the greater amount of water is to be withdrawn and cooled, and when any one or more of the sluices or raceways are not in use the surface of the bottom thereof is being reduced in temperature by exposure to the outer air, thus taking on cold, so to speak, to be used in effecting a cooling of the water when it is again delivered therethrough.

Any suitable or convenient arrangement of means may be employed for effecting a delivery of the water from the lake or pond into the raceways or sluices. As illustrative of an operative arrangement, but to which the invention is not limited or restricted, I have shown a paddle-wheel K suitably arranged and operated for effecting the desired object.

It is desirable that the water after circulating through the raceways or sluices or over the plateau, and thus cooled, be returned to the lake gently or smoothly, so as not to cause too great an agitation of the water in the lake or pond. In order to effect this result, I arrange the raceways or sluices to deliver into a basin (indicated at L) suitably constructed at the edge of the lake. This basin may be separated from the main body of the lake or pond by means of a dam M or otherwise, over the top edge of which the water from the basin flows into the lake or pond in a thin sheet, thus floating smoothly over the surface of the water in the lake, and hence without undue agitation thereof. In carrying out this idea I employ a floating apron N, suitably supported in the basin and at a point below the surface of the water contained therein, said apron being arranged to have a bearing upon the top edge of the dam, the water flowing from the basin over this apron, which operates to spread it out into a thin sheet. In this way the cooled water is returned to the lake or pond in a manner the most suitable and propitious for the congelation thereof. It is exceedingly desirable that the temperature of this water be reduced to the lowest possible degree before being returned to the lake, and inasmuch as a large quantity of refuse or broken pieces of ice collects at the ice-house where the ice is stored during the harvesting and storing operation, and which pieces are too small in size to be stored or otherwise used, I propose to utilize the same in cooling the water to be returned to the lake or pond. This idea may be carried out by removing such refuse or broken pieces of ice from the vicinity of the house and dumping the same into the raceways or sluices or on the plateau or in the basin L. It is obvious that ice taken from any desirable point in the lake may also be utilized for this purpose. In Fig. 1 I have shown as illustrative of operative means a carrier O, arranged to extend from the ice-house, where such broken pieces of ice collect, to the basin, and which may serve to convey the broken pieces of ice to the basin. In this manner the temperature of the water returned to the lake or pond is reduced below that of the water in the pond, thus greatly facilitating the congelation of the water and increasing the quantity of the ice produced.

It will be seen from the foregoing description that every advantage is taken of natural means in the production of the ice. The movement created in the lake or pond by reason of the withdrawal therefrom and return thereto of some of the water prevents the freezing into the body of ice of air-bubbles, as mentioned. By withdrawing the water into which has been liberated the latent heat given up by the water in passing into ice and cooling such withdrawn water and then returning it at a lower temperature not only is the formation of ice facilitated, but it is also very greatly accelerated and increased, and that, too, without depending on or reference to any source of water-supply, as in the case of my former patent, No. 277,024. This is a material advantage in several ways. In the first place the present operation may be carried out without any source of supply to the lake or pond, as the body of water contained therein suffers no diminution by withdrawing or removing a portion therefrom and returning such withdrawn portion after its temperature has been reduced. In other words, the place of the withdrawn portion is immediately taken up by an equal amount returned, whereas in my prior patent only the supply is cooled, and hence in extremely cold weather the supply-channel may become entirely frozen up or the source may dry up and give out, and in such event the operation of the process set forth in said patent ceases and the congelation process going on on the main body of the pond or lake is retarded by the liberated latent heat which is thus confined therein, whereas in the present arrangement by withdrawing the heated water from the pond or lake, cooling, and then returning it the formation of ice proceeds rapidly, and hence enables several harvests of ice to be taken from the lake or pond in the same season. In this manner the output is vastly increased and the quantity of ice harvested in each season is greatly multiplied, and this cannot be accomplished in the case of my prior patent, wherein the freezing up or giving out of the supply-water, as in the case of extremely severe cold or dry weather, arrests the formation of ice and wherein at best the mere cooling of the supply is not sufficient to overcome the amount of latent heat liberated by the formation of the ice in the lake or pond. Moreover, the results I secure in the present case are not obtainable in the case of my prior patent, No. 250,235, above referred to, for the reason that in said patent it is proposed merely to set in motion the water in the lake or pond to prevent the freezing of air-bubbles into the body of the forming ice. It is not designed nor intended to effect a cooling of the water of the pond or lake, and the arrangement of such patent is not adapted for such results. The liberated latent heat of the ice formation remains in the pond or lake, and hence retards the formation of ice. This is what I avoid in the present case by entirely withdrawing the heated water from the lake, and hence removing it as an element which retards the formation of ice, and by spreading out such withdrawn or removed heated water into a thin sheet and over a frozen surface or otherwise which is separated from the pond or lake, whereby it is cooled, and then returning such cooled water the formation of ice progresses rapidly and efficiently and I am enabled to reap several harvests from the same lake or pond each season where only one harvest has been yielded heretofore.

The apparatus described and shown is designed to be merely illustrative of operative constructions and arrangements embodying the principles of my invention. It is obvious that the construction and details thereof may be varied throughout a wide range and some of the features may be used alone or omitted. I do not desire, therefore, to be limited or restricted to the exact details shown and described.

I do not claim the process involved, as the same forms the subject-matter of my application, Serial No. 741,490, filed December 23, 1899; but, Having now set forth the object and nature of my invention and embodiments of the principles thereof and having described the construction, function, and mode of operation involved, what I claim as new and useful and of my own invention, and desire to secure by Letters Patent of the United States, is—

1. The combination with a pond or lake, of means for entirely withdrawing a portion of the water therefrom into which has been liberated the latent heat of that portion of the water which has previously passed into ice, and delivering said withdrawn water upon a cooling-surface separated from the lake or pond, whereby the temperature of such withdrawn water is reduced, and means for returning such cooled and withdrawn water to the lake or pond, as and for the purpose set forth.

2. The combination with a pond or lake, of one or more sluices or raceways separated from, but communicating at the ends thereof, with said lake or pond, means arranged at one end of said sluices or raceways for withdrawing water from the lake or pond during the formation of ice and delivering the same into the sluices or raceways in a thin sheet, whereby the temperature of such withdrawn water is reduced while passing through such sluices or raceways, and said water is returned to the lake or pond at a reduced temperature, as and for the purpose set forth.

3. The combination with a lake or pond, of one or more sluices or raceways separated from, but communicating at the ends thereof with, said lake or pond, a series of slabs or posts arranged in said sluices or raceways and projecting above the same, and means for withdrawing the water from the lake or pond during the formation of ice and delivering the same upon the surface of said sluices or raceways in a thin sheet, whereby the temperature of such withdrawn water is reduced while passing over the surface of said sluices or raceways, and such withdrawn water is returned to the lake or pond at a reduced temperature, as and for the purpose set forth.

4. The combination with a lake or pond and one or more signals arranged therein to indicate the temperature at various depths thereof, of a series of raceways or sluices communicating at their ends with said lake, a gate for controlling each raceway or sluice, and means for circulating a portion of the water of the lake or pond through such raceways or sluices, as and for the purpose set forth.

5. The combination with a lake or pond, and a cooling-surface adjacent to but separated from the lake or pond, of means for withdrawing a portion of the water from the lake or pond during the period of ice formation and delivering the same in a thin sheet upon said cooling-surface, whereby the temperature of such withdrawn water is reduced and such water of reduced temperature is returned to the lake or pond, as and for the purpose set forth.

6. The combination with a lake or pond, and a cooling-surface separated from but adjacent to the lake or pond, and communicating at each end with the lake or pond, of means arranged at the receiving end of said cooling-surface for withdrawing a portion of the water from the lake or pond during the period of ice formation and delivering the same in a thin sheet upon said cooling-surface, whereby the temperature of such withdrawn water is reduced, and a cooling-basin arranged at the delivery end of said cooling-surface to receive the cooled water therefrom, said basin delivering into the lake or pond, as and for the purpose set forth.

7. The combination with a lake or pond, and a basin communicating therewith, and a cooling-surface separated from but adjacent to the lake or pond, said cooling-surface delivering into said basin, of means for circulating a portion of the water from said lake or pond, during the formation of ice, over said cooling-surface and into said basin, and means whereby the temperature of the water in the basin may be cooled, as and for the purpose set forth.

8. The combination with a lake or pond and a cooling-basin, of means for circulating a portion of the water from such lake or pond into said basin, means for cooling the water while being circulated from said pond to said basin, and means whereby such water is returned to the lake from such basin in a thin sheet, as and for the purpose set forth.

9. The combination with a lake or pond, of a cooling-basin, a dam separating the same, an apron arranged in said basin and resting upon said dam, and means for circulating a portion of the water from said lake or pond into said cooling-basin, as and for the purpose set forth.

10. The combination with a lake or pond, a cooling-surface separated from but adjacent to said lake or pond, means for delivering a sheet of water upon said cooling-surface to secure a solid frozen surface thereon, means for withdrawing a portion of the water from said lake or pond during the period of ice formation and delivering the same in a thin sheet over said frozen surface, whereby the temperature of such withdrawn water is reduced, and means for returning such water to the lake or pond from such frozen surface, as and for the purpose set forth.

In witness whereof I have hereunto set my hand, this 2d day of June, 1899, in the presence of the subscribing witnesses.

OSSIAN GUTHRIE.

Witnesses:
E. C. SEMPLE,
S. E. DARBY.